(12) United States Patent
Mills et al.

(10) Patent No.: US 9,312,674 B2
(45) Date of Patent: Apr. 12, 2016

(54) FACEPLATE FOR ELECTRICAL SWITCHING APPARATUS PANEL AND ELECTRICAL SWITCHING APPARATUS PANEL INCLUDING SAME

(71) Applicant: LABINAL, LLC, Denton, TX (US)

(72) Inventors: Patrick Wellington Mills, Bradenton, FL (US); Peter J. Almanza, Brandon, FL (US); Richard George Benshoff, Sarasota, FL (US); James Michael McCormick, Bradenton, FL (US)

(73) Assignee: Labinal, LLC, Denton, TX (US)

( * ) Notice: Subject to any disclaimer, the term of this patent is extended or adjusted under 35 U.S.C. 154(b) by 6 days.

(21) Appl. No.: 14/390,258

(22) PCT Filed: Mar. 15, 2013

(86) PCT No.: PCT/US2013/031829
§ 371 (c)(1),
(2) Date: Oct. 2, 2014

(87) PCT Pub. No.: WO2013/151737
PCT Pub. Date: Oct. 10, 2013

(65) Prior Publication Data
US 2015/0062786 A1    Mar. 5, 2015

Related U.S. Application Data

(63) Continuation of application No. 61/621,162, filed on Apr. 6, 2012.

(51) Int. Cl.
*H02G 3/14*     (2006.01)
*H02B 1/056*    (2006.01)
(Continued)

(52) U.S. Cl.
CPC . *H02G 3/14* (2013.01); *H01H 9/18* (2013.01); *H02B 1/056* (2013.01); *H02B 1/044* (2013.01)

(58) Field of Classification Search
CPC .............. H02G 3/14; H02B 1/04; H02B 1/14; H02B 1/056; H02B 7/00; H01H 9/18; H01H 9/28; H01H 50/14; H01R 4/30; H01R 4/02; G01R 19/0092; H05K 5/06
USPC ......... 361/600, 605, 611–613, 624, 627, 629, 361/631–637, 641–648, 653, 656–658, 673, 361/679.01; 174/50, 50.5, 50.51–50.54, 174/520, 532, 547, 650, 653, 667, 17 A, 174/35 R, 541, 561, 67; 312/223.2, 223.3, 312/265; 439/76.1, 76.2, 147, 587–589, 439/349, 462, 810, 887, 874; 200/50, 293, 200/296, 297, 335, 332, 330; 218/33, 34, 218/157; 335/2, 202, 172, 190, 23, 167
See application file for complete search history.

(56) References Cited

U.S. PATENT DOCUMENTS

| 2,681,966 A | 6/1954 | Christensen |
| 6,454,591 B1 * | 9/2002 | Pradier ................ H01R 4/38 439/364 |

(Continued)

FOREIGN PATENT DOCUMENTS

DE    32 46 922    6/1984

*Primary Examiner* — Michail V Datskovskiy
(74) *Attorney, Agent, or Firm* — Rankin, Hill & Clark LLP

(57) ABSTRACT

A faceplate for use in a panel for electrical switching apparatus includes a generally planar member having a first surface, an opposite second surface and a number of apertures disposed through the first surface and the opposite second surface. Each aperture is configured to receive an actuatable mechanism of an electrical switching apparatus. The faceplate further includes a number of inclined features, each extending from the opposite second surface about a respective aperture of the number of apertures. At least one inclined feature includes an inclined surface disposed opposite the opposite second surface of the generally planar member. The inclined surface is disposed at a non-zero angle with respect to the generally planar member.

11 Claims, 6 Drawing Sheets

(51) Int. Cl.
   *H01H 9/18* (2006.01)
   *H02B 1/044* (2006.01)

(56) References Cited

U.S. PATENT DOCUMENTS

| | | | | |
|---|---|---|---|---|
| 7,898,787 B2* | 3/2011 | Johnsen | ............... | H01R 13/514 |
| | | | | 361/119 |
| 8,094,436 B2* | 1/2012 | Mills | ..................... | H02B 1/056 |
| | | | | 361/634 |
| 8,328,575 B2* | 12/2012 | Meux | ..................... | H02B 1/056 |
| | | | | 361/634 |
| 2007/0298652 A1* | 12/2007 | Clark | ..................... | H04Q 1/131 |
| | | | | 439/540.1 |
| 2010/0296229 A1* | 11/2010 | Meux | ..................... | H02B 1/056 |
| | | | | 361/605 |
| 2011/0235244 A1 | 9/2011 | Mills et al. | | |
| 2013/0201608 A1* | 8/2013 | Mills | ..................... | H02B 1/056 |
| | | | | 361/636 |
| 2014/0126119 A1* | 5/2014 | Mills | ..................... | H02B 1/04 |
| | | | | 361/636 |

* cited by examiner

FACEPLATE FOR ELECTRICAL SWITCHING APPARATUS PANEL AND ELECTRICAL SWITCHING APPARATUS PANEL INCLUDING SAME

CROSS-REFERENCE TO RELATED APPLICATION

This application claims the benefit of U.S. Provisional Patent Application Ser. No. 61/621,162, filed Apr. 6, 2012, entitled "IMPROVED PLUG-IN CIRCUIT BREAKER PANEL," which is incorporated by reference herein.

BACKGROUND

1. Field

The disclosed concept pertains generally to panels for electrical switching apparatus and, more particularly, to faceplates for use with such panels. The disclosed concept further relates to electrical switching apparatus panels including such faceplates.

2. Background Information

Electrical switching apparatus, such as circuit breakers are used, for example, in aircraft electrical systems where they not only provide overcurrent protection but also serve as switches for turning equipment on and off. Aircraft or sub-miniature circuit breakers, for instance, are typically relatively small to accommodate the relatively high-density layout of aircraft circuit breaker panels, which make circuit breakers for numerous circuits accessible to a user. Aircraft electrical systems can consist, for example, of hundreds of circuit breakers, each of which is used for a circuit protection function as well as a circuit disconnection function through a push-pull handle, toggle, or other actuatable mechanism.

The actuatable mechanism of such breakers typically extends through, and outward from, a planar faceplate of a panel. Due to the generally tight confines in which such circuit breaker panels are placed, such panels must commonly be mounted in positions in which such planar faceplates are disposed at angles which are oblique to the line of sight of an operator who would be monitoring and switching such handles or toggles.

There is thus room for improvement in electrical switching apparatus panels and faceplates therefore.

SUMMARY

These needs and others are met by embodiments of the disclosed concept, which provide a faceplate for use in a panel for electrical switching apparatus and a panel including such a faceplate. Among other benefits, the faceplate provides improved viewing of indicia associated with, and identifying particular breakers particularly when the associated breaker panel is mounted in locations at angles not directed directly at an observer looking at the panel. Also, embodiments of the disclosed concept allows for closer packaging of electrical switching apparatus within a panel.

As one aspect of the disclosed concept, a face plate for use in a panel for electrical switching apparatus is provided. The faceplate includes: a generally planar member having a first surface, an opposite second surface and a number of apertures disposed through the first surface and the opposite second surface. Each aperture is configured to receive an actuatable mechanism of an electrical switching apparatus therethrough. The faceplate further includes a number of inclined features, each of the inclined features extending from the opposite second surface about a respective aperture of the number of apertures. At least one inclined feature includes an inclined surface disposed opposite the opposite second surface of the generally planar member. The inclined surface is disposed at a non-zero angle with respect to the generally planar member.

The inclined surface may include an indicia defining a characteristic of the electrical switching apparatus or circuit associated with the aperture about which the inclined feature is disposed.

The non-zero angle may be in the range of from about 5 degrees to about 60 degrees, although other angles may be employed.

The number of inclined features may include at least two inclined features joined together to form a single unitary inclined feature.

The generally planar member may include a number of captive fasteners structured to removably engage a housing of the panel such that the face plate is removably coupled to the panel.

A second inclined feature of the number of inclined features may include a second inclined surface disposed opposite the opposite second surface of the generally planar member, and the second inclined surface may be disposed at a second non-zero angle different from the non-zero angle with respect to the generally planar member.

A third inclined feature of the number of inclined features may include a third inclined surface disposed opposite the opposite second surface of the generally planar member. The third inclined surface may be disposed at a third non-zero angle with respect to the generally planar member, the third non-zero angle being different from both of the non-zero angle and the second non-zero angle.

As another aspect of the disclosed concept, a panel for electrical switching apparatus is provided. The panel includes: a housing; an electrical bus structure coupled to the housing; a number of electrical switching apparatus electrically coupled to the electrical bus structure, each having an actuatable mechanism; and a faceplate as described herein.

These and other objects, features, and characteristics of the disclosed concept, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed concept.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
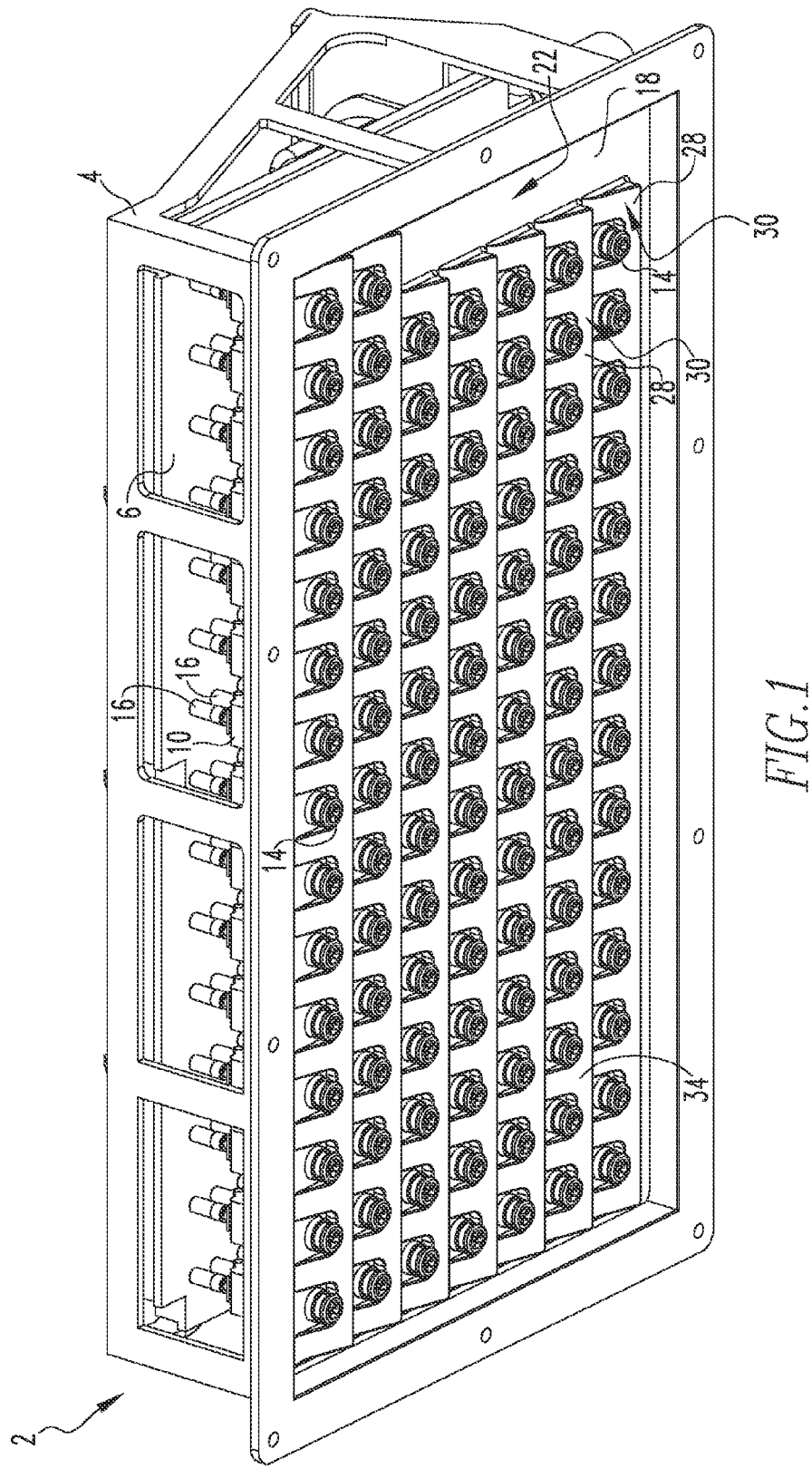
FIG. 1 is an isometric view of a circuit breaker panel assembly according to an example embodiment of the disclosed concept.
Figure 2:
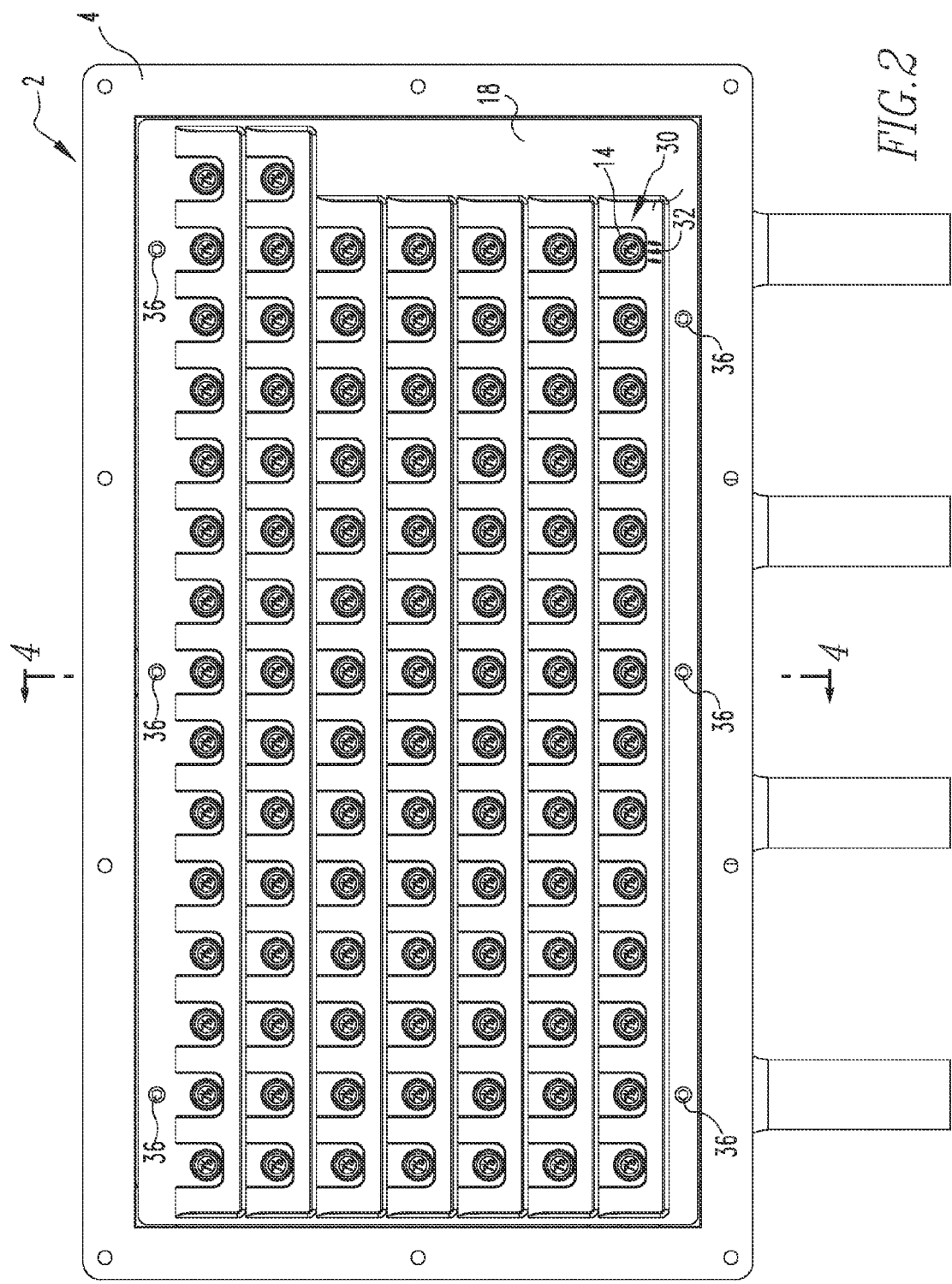
FIG. 2 is a front elevation view of the circuit breaker panel assembly of FIG. 1.

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the term "fastener" refers to any suitable connecting or tightening mechanism expressly including, but not limited to, screws, bolts, nuts (e.g., without limitation, lock nuts) and combinations thereof.

As employed herein, the term "electrical switching apparatus" refers to mechanisms employed in electrical circuits such as, for example, without limitation, circuit breakers, interrupters, switches and contactors. As employed herein, the term "actuatable mechanism" shall be used to the portion of an "electrical switching apparatus" that is switchable (e.g., without limitation, a manual operator, toggle switch, etc.).

The disclosed concept is described in association with subminiature or aircraft circuit breakers, although the disclosed concept is applicable to a wide range of electrical switching apparatus for a wide range of different applications. Such circuit breakers can be employed, for example and without limitation, in aircraft alternating current (AC) electrical systems having a typical frequency of about 400 Hz, but can also be used in direct current (DC) systems. It will also become evident that the disclosed concept is applicable to other types of circuit breaker panels including those used in AC systems operating at other frequencies; to larger circuit breakers, such as miniature residential or commercial circuit breakers; and to a wide range of circuit breaker applications, such as, for example, without limitation, residential, commercial, industrial, aerospace, and automotive. As further non-limiting examples, both AC (e.g., without limitation, 120, 220, 480-600 VAC) operation at a wide range of frequencies (e.g., without limitation, 50, 60, 120, 400 Hz, and higher or lower frequencies) and DC operation (e.g., without limitation, 42 VDC) are possible.

Referring to FIGS. 1-4, an example electrical switching apparatus panel, more particularly an example plug-in circuit breaker panel 2, is shown. Although not limited thereto, the example panel 2 is particularly suited for use in an aerospace (e.g., aircraft) electrical systems. The plug-in circuit breaker panel 2 includes a housing 4, an electrical bus structure 6 coupled to the housing 4, a number of first plug-in members 8 (shown in hidden line in FIG. 4) coupled to the electrical bus structure 6, and a number of circuit breakers 10 (two rows of fifteen circuit breakers and five rows of fourteen circuit breakers are shown in the illustrated example embodiment of FIGS. 1-4, although any suitable number can be employed).

Figure 3:
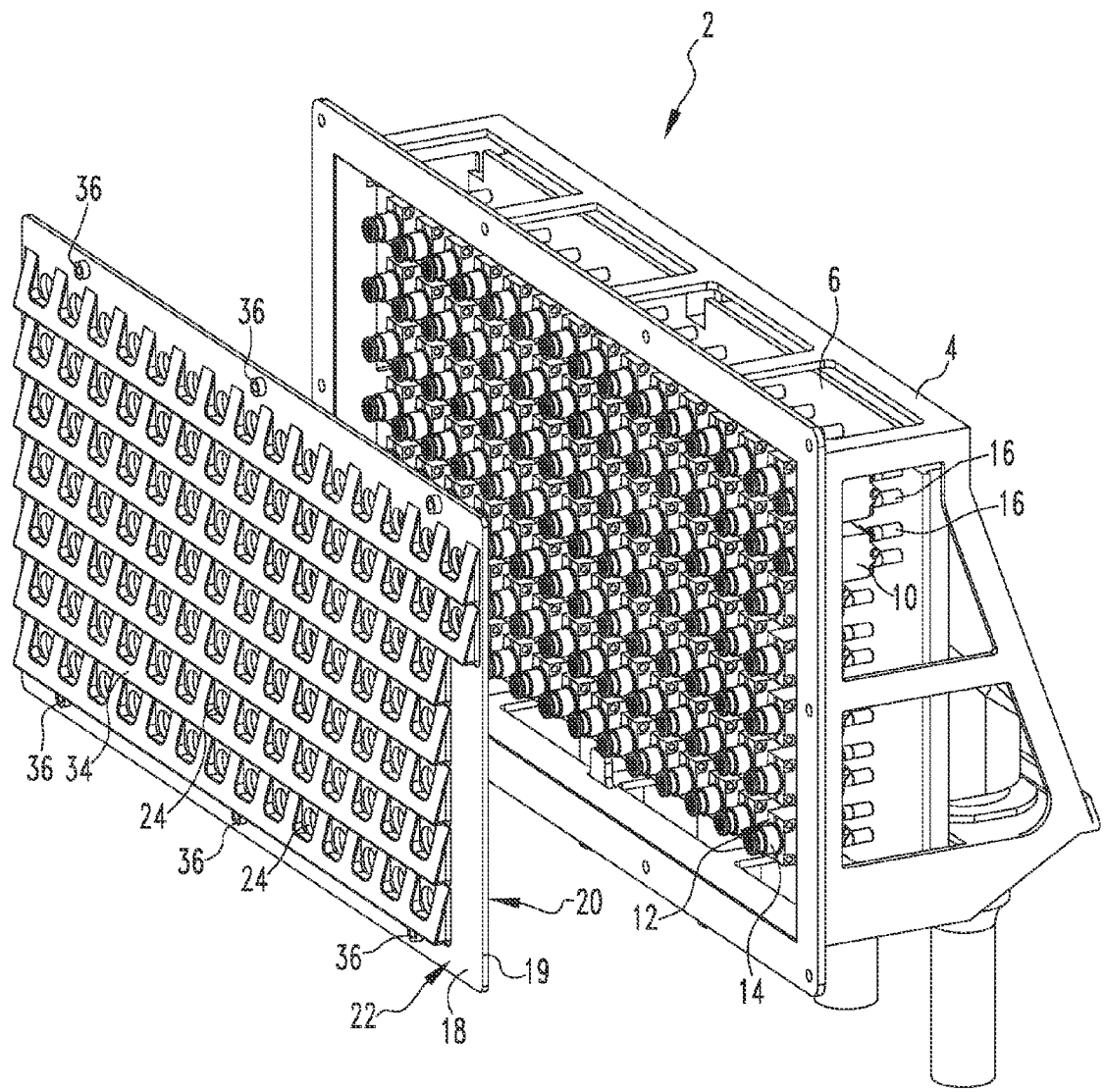
FIG. 3 is another isometric view of the circuit breaker panel of FIG. 1 with the faceplate exploded outward from the circuit breaker panel.
Figure 4:
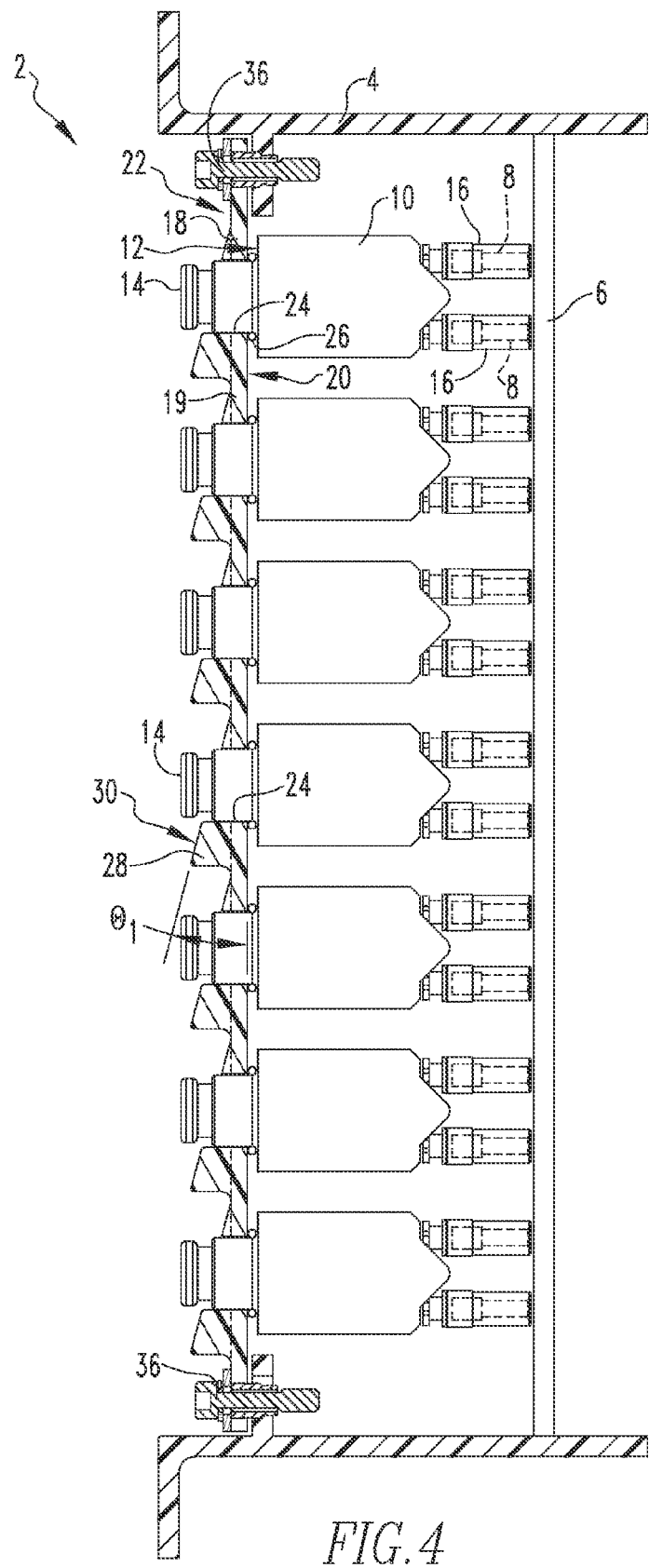
FIG. 4 is a partial section view of the circuit breaker panel assembly of FIGS. 1-3 taken along line 4-4 of FIG. 2.

Referring generally to FIGS. 3 and 4, each circuit breaker 10 includes a first surface 12, an actuatable mechanism in the form of a manual operator 14 (e.g., without limitation, a push-pull operating handle) disposed from the first surface 12 and a second plug-in member 16 (FIG. 4) disposed opposite the first surface 12. The second plug-in member 16 of each of the circuit breakers 10 is mated with a corresponding one of first plug-in members 8. Each second plug-in member 16 and the mated corresponding first plug-in member 8 cooperate to provide one of a power input (e.g., line) to, or a load output (e.g., load) from, the corresponding circuit breaker 10 via the electrical bus structure 6. The power input can be, for example, a single phase AC input or a single DC input. Alternatively, the power input can be, for example, a three-phase AC input.

A plate member, such as the example faceplate 18, is removably coupled to the housing 4. In example embodiments of the disclosed concept, faceplate 18 is formed from a molded plastic, stamped metal (e.g., without limitation, aluminum), or other suitable material. It is to be appreciated, however, that other suitable materials may be employed without varying from the scope of the disclosed concept.

The faceplate 18 includes a generally planar member 19 (FIG. 3) having a first surface 20, an opposite second surface 22 and a number of apertures 24 disposed through the first surface 20 and the opposite second surface 22 of the face plate 18. The manual operator 14 of each of the circuit breakers 10 passes through a corresponding one of the apertures 24. The first surface 12 of each circuit breaker 10 generally engages the opposite second surface 22 of the face plate 18 either directly or via an o-ring 26 (as shown in FIG. 4) in order to maintain mating of each of the number of circuit breakers 10 with the corresponding first plug-in members 8.

The faceplate 18 further includes a number of inclined features 28 which extend from the opposite second surface 22 generally at or about a respective aperture 24 of the number of apertures. Each inclined feature includes an inclined surface 30 disposed opposite the second surface 22 of the generally planar member 19 of the faceplate 18. The inclined surface 30 of the inclined feature 28 may include nomenclature or other indicia 32 (FIG. 2), such as for example, without limitation, symbols, letters and/or numbers defining a characteristic of the circuit breaker or circuit within which it is installed (e.g., without limitation, "Landing Gear", "Flaps", "Fuel"). The indicia 32 may be applied to (either permanently or temporarily), or formed in or on, the faceplate.

As shown in the sectional view of FIG. 4, the inclined surface 30 is disposed at a non-zero angle $\theta_1$ with respect to the generally planar member 19. The specified angle $\theta_1$ may be determined based on the orientation of the panel installation. In aircraft applications where the panel 2 is installed in an overhead orientation such that the faceplate 18 containing the circuit breakers 10 is not oriented in a way that provides a pilot or other aircraft personnel with ideal line of sight, the inclined feature 28 may be configured at an angle $\theta_1$ that provides the pilot or other aircraft personnel an optimum line of sight with the indicia 32 provided on the inclined surface 30.

In the example shown in FIGS. 1-4, the angle $\theta_1$ is about 15°, however other angles may be employed without varying from the scope of the disclosed concept. Depending on the particular arrangement, angles in the range of about 5° to about 60° have been preferred. It is to be appreciated that in addition to providing an improved viewing angle for the indicia, embodiments of the disclosed concept also generally allow for the placement of the electrical switching apparatus to be condensed as the angled surfaces on which the indicia is disposed require less panel space than if the indicia were printed on a conventional flat panel.

As shown in the illustrated embodiment of FIGS. 1-4, multiple inclined features may be joined together to form a single unitary inclined feature 34 (FIGS. 1 and 2) which may be disposed about more than one aperture 24.

The faceplate 18 may include a number of captive fasteners 36 (e.g., without limitation, quarter-turn fastener(s)) removably engaging the housing 4 such that the faceplate 18 is removably coupled to the housing 4. Such arrangement readily provides for maintenance or inspection of one or more of the various circuit breakers 10, internal contactors, current sensing modules and electronics line replaceable units (LRUs).

Figure 5:
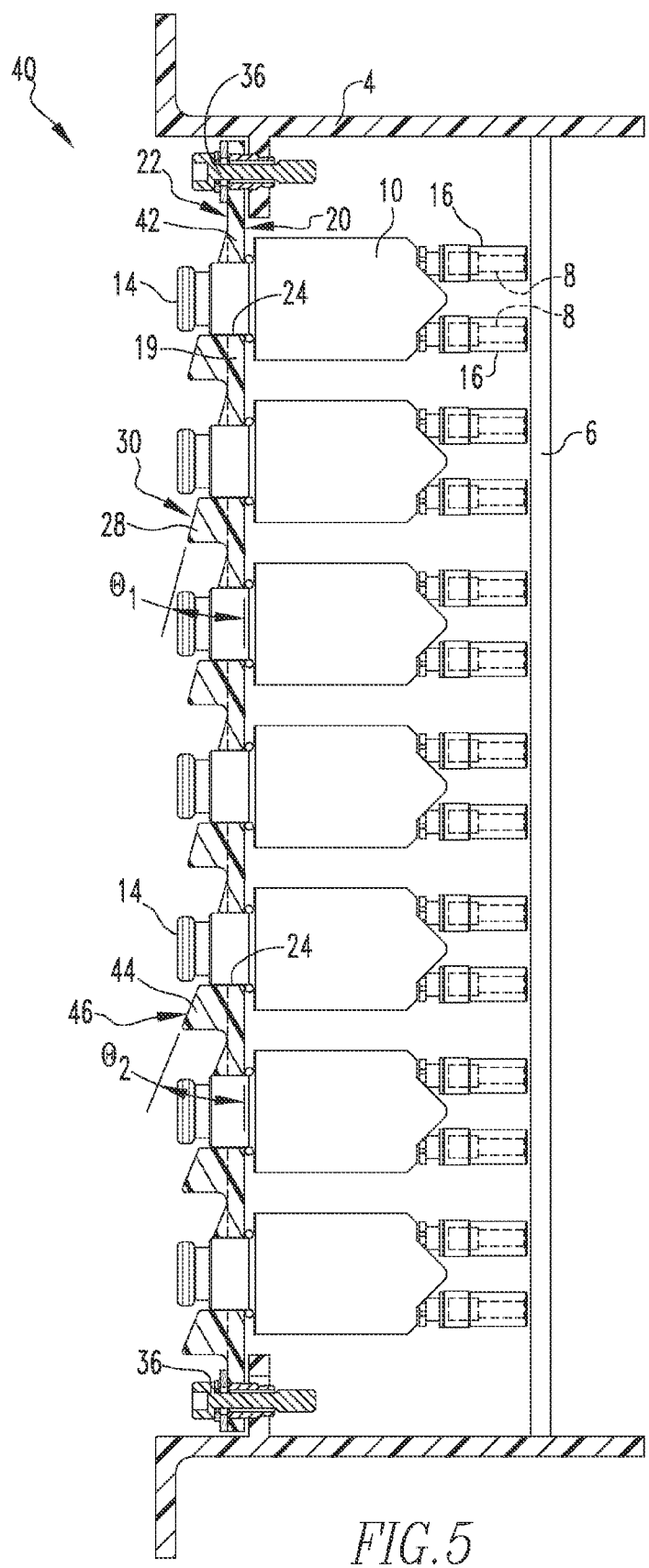
FIG. 5 is a partial section view of a circuit breaker panel assembly including another example faceplate according to another embodiment of the disclosed concept.

FIG. 5 shows a partial sectional view of another example panel 40 in accordance with another embodiment of the discloses concept. Panel 40 is of generally similar construction as the panel 2 previously described in conjunction with FIGS. 1-4 except panel 40 includes a faceplate 42 according to another example embodiment of the disclosed concept removably coupled to the housing 4. Faceplate 42 is of similar construction as faceplate 18 except faceplate 42 further includes a number of second inclined features 44 which extend from the opposite second surface 22 generally at or about a respective aperture 24 of the number of apertures. Each second inclined feature 44 includes a second inclined surface 46 disposed opposite the second surface 22 of the generally planar member 19 of the faceplate 42. The second inclined surface 46 may include nomenclature or other indicia such as indicia 32 (previously described). The second inclined surface 46 is disposed at a second non-zero angle $\theta_2$ (different than the non-zero angle $\theta_1$) with respect to the generally planar member 19. The specified second angle $\theta_2$ may be determined based on the orientation of the panel installation. In aircraft applications where the panel 40 is installed in an overhead orientation such that the faceplate 42 containing the circuit breakers 10 is not oriented in a way that provides a pilot or other aircraft personnel with ideal line of sight, the inclined feature(s) 28 may be configured at an angle $\theta_1$ that provides the pilot or other aircraft personnel optimum line of sight with the indicia 32 provided on the inclined surface(s) 30, while the second inclined feature(s) 44, which would be disposed further from the pilot or other aircraft personnel, 44 may be configured at the second angle $\theta_2$ that provides optimum line of sight with the indicia (not numbered) provided on the second inclined surface(s) 46.

Figure 6:
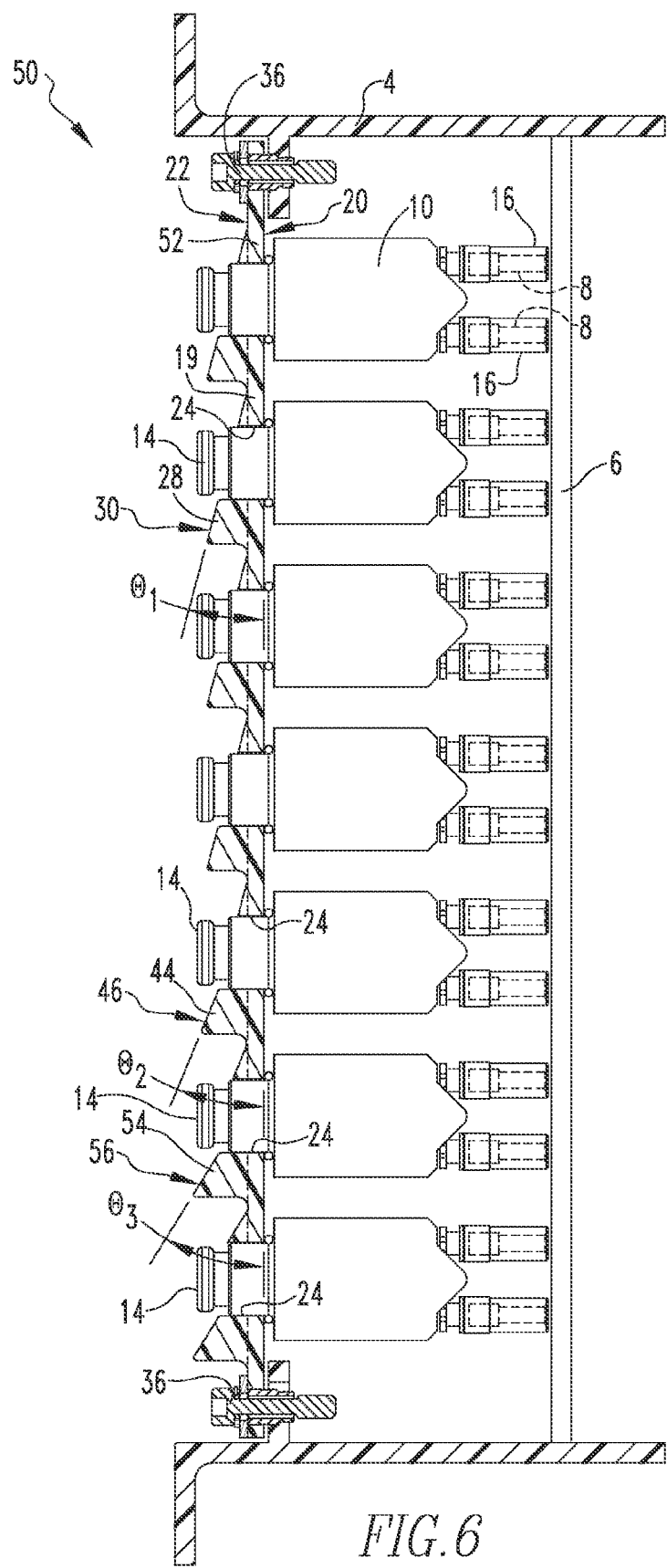
FIG. 6 is a partial section view of a circuit breaker panel assembly including yet another example faceplate according to a further example embodiment of the disclosed concept.

FIG. 6 shows a sectional view of yet another example panel 50 in accordance with another embodiment of the disclosed concept. Panel 50 is of generally similar construction as the panels 2 and 40 previously described in conjunction with FIGS. 1-4 and 5 except panel 50 includes a faceplate 52 according to yet another example embodiment of the disclosed concept removably coupled to the housing 4. Faceplate 52 is of similar construction as faceplates 18 and 42 except faceplate 52 further includes a number of third inclined features 54 which extend from the opposite second surface 22 generally at or about a respective aperture 24 of the number of apertures. Each third inclined feature 54 includes a third inclined surface 56 disposed opposite the second surface 22 of the generally planar member 19 of the faceplate 52. The third inclined surface 56 may include nomenclature or other indicia such as indicia 32 (previously described). The third inclined surface 56 is disposed at a third non-zero angle $\theta_3$ (different than the non-zero angle $\theta_1$ and the second non-zero angle $\theta_2$) with respect to the generally planar member 19. The specified third angle $\theta_3$ may be determined based on the orientation of the panel installation. In aircraft applications where the panel 50 is installed in an overhead orientation such that the faceplate 52 containing the circuit breakers 10 is not oriented in a way that provides a pilot or other aircraft personnel with ideal line of sight, the inclined feature(s) 28 may be configured at an angle $\theta_1$ that provides the pilot or other aircraft personnel optimum line of sight with the indicia 32 provided on the inclined surface(s) 30, while the second inclined feature(s) 44, which would be disposed further from the pilot or other aircraft personnel, may be configured at the second angle $\theta_2$ that provides optimum line of sight with the indicia (not numbered) provided on the second inclined surface(s) 46, and the third inclined feature(s) 54, which would be disposed even further from the pilot or other aircraft personnel, may be configured at the third angle $\theta_3$ that provides optimum line of sight with the indicia (not numbered) provided on the third inclined surface(s) 56.

While specific embodiments of the disclosed concept have been described in detail, it will be appreciated by those skilled in the art that various modifications and alternatives to those details could be developed in light of the overall teachings of the disclosure. For example, it is contemplated that one or more of the inclined surfaces of a faceplate may be additionally angled to face a particular point in a manner similar to seats in a concert hall. Additionally, it is contemplated that one or more rows of operators or actuators may be staggered from adjacent rows (i.e., not arranged in vertical columns) in order to improve one or both of visibility of identifying indicia or accessibility to such operators or actuators. Accordingly, the particular arrangements disclosed herein are meant to be illustrative only and not limiting as to the scope of the disclosed concept which is to be given the full breadth of the claims appended and any and all equivalents thereof.

What is claimed is:

1. A faceplate for use in a panel for electrical switching apparatus, the faceplate comprising:
   a generally planar member having a first surface, an opposite second surface and a number of apertures disposed through the first surface and the opposite second surface, each aperture being configured to receive an actuatable mechanism of an electrical switching apparatus therethrough; and
   a number of inclined features, each of the inclined features extending from the opposite second surface about a respective aperture of the number of apertures, at least one inclined feature having an inclined surface disposed opposite the opposite second surface of the generally planar member,
   wherein the inclined surface is disposed at a non-zero angle ($\theta_1$)angle with respect to the generally planar member.

2. The faceplate of claim 1 wherein the inclined surface of at least one of the number of inclined features includes an indicia defining a characteristic of the electrical switching apparatus or circuit associated with the aperture about which the inclined feature is disposed.

3. The faceplate of claim 1 wherein the non-zero angle is in the range of from about 5 to about 60 degrees.

4. The faceplate of claim 1 wherein the non-zero angle is about 15 degrees.

5. The faceplate of claim 1 wherein the number of inclined features includes at least two inclined features joined together to form a single unitary inclined feature.

6. The faceplate of claim 1 wherein the generally planar member includes a number of captive fasteners structured to removably engage a housing of the panel such that the faceplate is removably coupled to the panel.

7. The faceplate of claim 1 wherein a second inclined feature of the number of inclined features includes a second inclined surface disposed opposite the opposite second surface of the generally planar member, and
   wherein the second inclined surface is disposed at a second non-zero angle different from the non-zero angle with respect to the generally planar member.

8. The faceplate of claim 7 wherein a third inclined feature of the number of inclined features includes a third inclined surface disposed opposite the opposite second surface of the generally planar member,
   wherein the third inclined surface is disposed at a third non-zero angle with respect to the generally planar member, and
   wherein the third non-zero angle is different from both of the non-zero angle and the second non-zero angle.

9. A panel for electrical switching apparatus comprising:
a housing;
an electrical bus structure coupled to the housing;
a number of electrical switching apparatus electrically coupled to the bus structure, each electrical switching apparatus having an actuatable mechanism; and
the faceplate as recited in claim 1.

10. A panel for electrical switching apparatus comprising:
a housing;
an electrical bus structure coupled to the housing;
a number of electrical switching apparatus electrically coupled to the bus structure, each electrical switching apparatus having an actuatable mechanism; and
the faceplate as recited in claim 7.

11. A panel for electrical switching apparatus comprising:
a housing;
an electrical bus structure coupled to the housing;
a number of electrical switching apparatus electrically coupled to the bus structure, each electrical switching apparatus having an actuatable mechanism; and
the faceplate as recited in claim 8.

* * * * *